United States Patent [19]

Ziv

[11] Patent Number: 4,544,112

[45] Date of Patent: Oct. 1, 1985

[54] SAFETY BELT WEBBING EMERGENCY LOCKING APPARATUS

[75] Inventor: Avraham Ziv, Sepulveda, Calif.

[73] Assignee: American Safety Equipment Corporation, Troy, Mich.

[21] Appl. No.: 579,983

[22] Filed: Mar. 9, 1984

Related U.S. Application Data

[63] Continuation of Ser. No. 227,275, Jan. 22, 1981, abandoned.

[51] Int. Cl.$^4$ .................. A62B 35/02; B65H 75/48
[52] U.S. Cl. .................. 242/107.2; 280/806; 242/107.4 A
[58] Field of Search ....... 242/107.2, 107.4 R–107.4 E; 280/801, 803, 806–808; 297/468–480; 188/65.1, 67; 24/136 R, 236 SW, 263 SB

[56] References Cited

U.S. PATENT DOCUMENTS

| | | |
|---|---|---|
| 1,815,386 | 7/1931 | Willard . |
| 2,193,407 | 3/1940 | Hagen . |
| 3,240,510 | 3/1966 | Spouge .................. 242/107.4 A |
| 3,372,777 | 3/1968 | Filippi et al. .................. 280/806 X |
| 3,439,932 | 4/1969 | Lewis et al. .................. 280/806 |
| 3,504,867 | 4/1970 | Stevenson .................. 242/107.2 |
| 3,834,496 | 9/1974 | Takada .................. 242/107.2 |
| 3,871,599 | 3/1975 | Takada .................. 242/107.2 |
| 3,911,535 | 10/1975 | Mauron . |
| 3,918,658 | 11/1975 | Beller .................. 242/107.4 A |
| 4,093,042 | 6/1978 | Pradon .................. 188/67 X |
| 4,120,466 | 10/1978 | Adomeit .................. 242/107.2 |
| 4,128,261 | 12/1978 | Paitula .................. 280/806 |
| 4,241,886 | 12/1980 | Maekawa .................. 242/107.2 |
| 4,249,708 | 2/1981 | Asano .................. 242/107.2 |
| 4,451,062 | 5/1984 | Ziv .................. 242/107.2 X |

FOREIGN PATENT DOCUMENTS

| | | |
|---|---|---|
| 2215846 | 8/1974 | France . |
| 2226840 | 11/1974 | France . |
| 2383677 | 10/1978 | France . |
| 532494 | 1/1973 | Sweden . |

Primary Examiner—John M. Jillions
Attorney, Agent, or Firm—Poms, Smith, Lande & Rose

[57] ABSTRACT

A safety belt webbing emergency locking apparatus has clamping means for selectively clamping safety belt webbing against further movement relative to the clamping means and an inertia responsive means for operating the clamping means independently of webbing movement to a webbing clamp position in response to changes in vehicle inertia, the clamping means including a wedge shaped clamp member having a high strength, resilient and high coefficient of friction material provided for engaging the webbing portions to be clamped, biasing means for normally biasing the wedge member toward a webbing clamping position, releasable retaining means for normally holding the wedge member against movement under its bias and tripping means operated in response to changes in vehicle inertia for releasing the retaining means to allow wedge movement under its bias to the webbing clamping position. The vehicle inertia activated clamping means may be employed as the sole restraint apparatus of a safety belt or in combination with an emergency locking retractor to provide a dual locking system.

8 Claims, 6 Drawing Figures

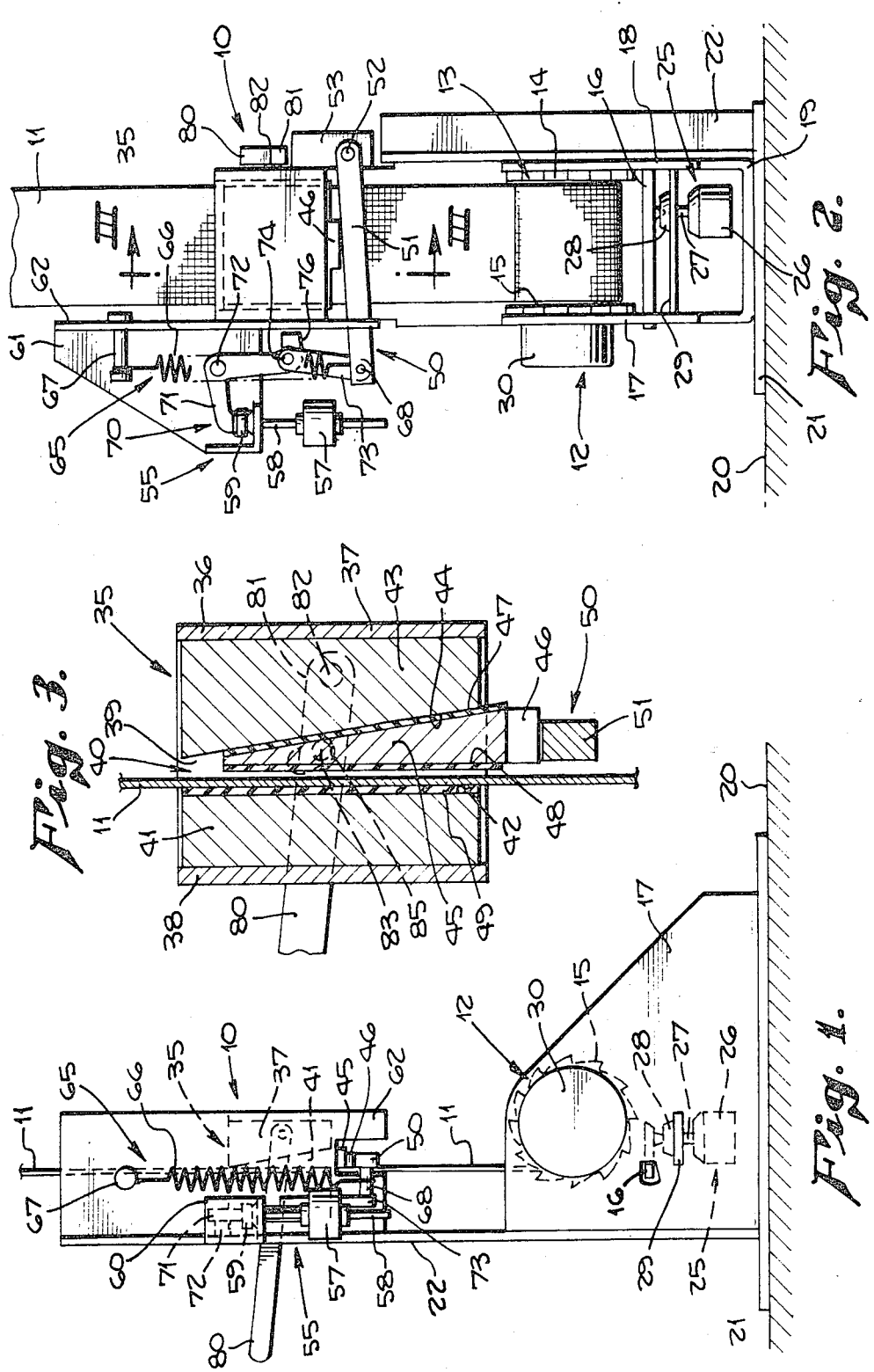

SAFETY BELT WEBBING EMERGENCY LOCKING APPARATUS

This application is a continuation of application Ser. No. 06/227,275, filed Jan. 22, 1981 now abandoned.

BACKGROUND OF THE INVENTION

This invention relates in general to safety belt systems employed in automotive vehicles for restraining passengers in their seats during emergency conditions encountered by the vehicle, and more particularly to safety belt restraint devices employed for restraining a single safety belt or belt webbing employed in such systems in the event of such emergency conditions.

It is presently common practice in the automotive industry to employ occupant restraint devices wherein safety belts employed in the systems are wound upon automatic, emergency locking safety belt retractors secured to the vehicle frame. It has also become apparent that there is a certain amount of safety belt webbing extension encountered on the locking of such retractors due to the tightening of belt webbing about the retractor spool and the extension of the webbing portions stored in the retractor. It is therefore a primary object of the present invention to provide an emergency locking safety belt restraint apparatus which will reduce the amount of safety belt extension following activation of the associated locking means in the event of an emergency condition.

More specifically, it is the object of the present to disclose and provide a safety belt webbing emergency locking apparatus which provides a quick acting positive restraint of the safety belt in the event of an emergency, reduces belt webbing extension after actuation of the emergency locking retractor due to webbing portions about the retractor spool tightening extending about the spool and to provide such a positive restraint on the webbing without damaging the webbing and without interferring with the normal operation of an emergency locking retractor where the same is employed.

BRIEF DESCRIPTION OF THE INVENTION

Generally stated, the apparatus according to the present invention, includes the provision of clamping means for selectively clamping directly upon the safety belt webbing to positively prevent its further movement in the event of an emergency condition and more specifically, the provision of such clamping means in association with inertia responsive means for operating the clamping means in response to changes in vehicle inertia independently of webbing movement. In order to obviate adverse wear and tear on the webbing, it is contemplated within the present invention that a relatively soft, pliant high strength and high coefficient of friction material be provided in association with the clamping means to engage the webbing portions being clamped to thereby distribute the clamping forces evenly upon the webbing.

Rather than having the clamping means operate in response to webbing movement, as might be occasioned by the occupant moving in response to vehicle acceleration or deceleration, it is contemplated within the present invention that the clamping means is self operating, under its own power, to effectively and quickly clamp the webbing against further movement relative to the clamping means in response to actuation by a vehicle inertia responsive means. In an exemplary embodiment of the present invention, the clamping means is provided with a spring biasing means for normally biasing a wedge member toward a webbing restraint position with an over center linkage type restraining means for holding the wedge against movement until a tripping means, including a vehicle inertia sensor mass, acts in response to vehicle changes in inertia to trip the linkage and release the wedge for movement to the webbing restraint position under the bias of the associated spring means.

The present invention also contemplates the provision of the aforementioned inertia responsive self powered webbing clamping means in association with an emergency locking retractor to provide a dual locking system wherein the retractor may be set to lock at low G levels and be self resetting for functioning in its normal manner to restrain vehicle passengers during severe maneuvering conditions of the vehicle while the clamping means can be set to operate at higher G levels and perform its quick acting positive restraint of the belt in the event of vehicle collision situations. The clamping means of the present invention is further provided in the exemplary embodiment to be manually reset after actuation to a webbing restraint position so as to provide for a very positive and continuing restraint of the safety belt and the associated vehicle occupant until such time as it is manually reset.

DESCRIPTION OF THE DRAWINGS

FIG. 1 is a side elevational view of an exemplary safety belt emergency locking apparatus in accordance with the present invention;

FIG. 2 is a front view of the apparatus of FIG. 1;

FIG. 3 is a detailed section view of the apparatus of FIG. 2 taken therein along the plane III—III;

Figure 4:
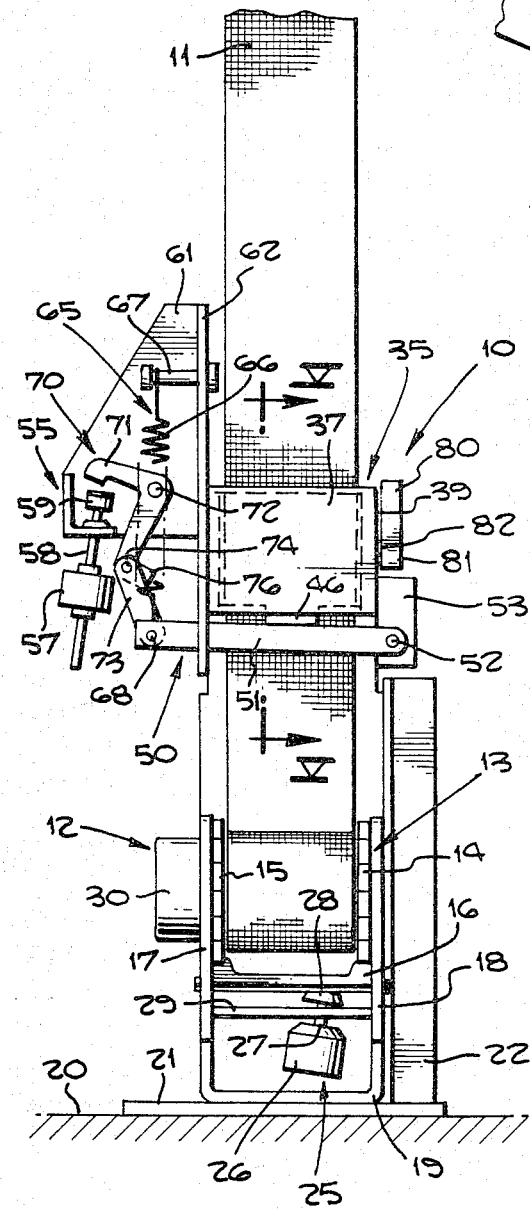
FIG. 4 is a front view of the apparatus of FIGS. 1 through 3 shown in a safety belt locking condition.

An exemplary embodiment of the safety belt emergency locking apparatus of the present invention will now be described in detail in association with the accompanying drawings. Referring initially to FIGS. 1 and 2, a preferred exemplary embodiment of a vehicle inertia operated safety belt webbing clamping apparatus is illustrated generally at 10 for restraining safety belt webbing 11 in response to vehicle acceleration or deceleration of more than a predetermined amount and independently of movement of the webbing itself, as will be explained more fully hereinafter. In the exemplary embodiment of emergency locking apparatus, safety belt webbing 11 is further associated with an emergency locking retractor, indicated generally at 12, which may be of a standard type now in use commercially in automotive safety belt restraining systems. Alternatively, it may be made of light weight, even plastic material, to withstand only low loading with the higher loads being taken by the clamping means indicated generally at 10. As is well known in the art, the emergency locking retractor, indicated generally at 12, is provided with a belt storing spool 13 having side mounted ratchet wheels 14 and 15. A lock bar 16 is mounted at its ends in apertures in the side walls 17 and 18 of the U-shaped retractor frame 19 in known manner to pivot between ratchet wheel engaging and disengaging positions. The retractor frame 19 may be mounted directly to the vehicle support structure, indicated generally at 20, by a base plate 21 in the exemplary embodiment. A vertical pillar 22 may correspond to the "B" pillar of an automobile frame. The retractor operates in known manner in response to changes in vehicle inertia through the use of an inertia sensing means indicated generally at 25. Such inertia sensing means in the exemplary embodiment includes a pendulum type inertia mass 26 suspended by stem 27 from head 28 which overlies an aperture in cross brace 29 through which stem 27 is freely positioned. When the vehicle encounters an acceleration, or deceleration, of more than a predetermined amount, movement of pendulum mass 26 operates the locking bar 16 through underlying engagement head 27 to engage ratchets 14 and 15 and to thereby lock spool 13 against unwinding rotation and preventing further belt protraction. The retractor further includes a rewind spring within spring housing 30 for normally biasing the safety belt webbing toward a wound up, stored condition on the retractor spool.

When the safety belt retractor indicated generally at 12 is operated to a safety belt webbing restraining condition, as seen in FIG. 4, and the spool 13 is prevented from further belt unwinding rotation, there is still a tendency for the webbing 11 to continue to protract relative to the retractor by virtue of a tightening of the roll of webbing about the spool in addition to potential elongation of the webbing itself which is wound about the spool. As is particularly contemplated within the present invention, inertia responsive means are provided in accordance with the present invention for clamping the webbing portions outside of the retractor in the event of an emergency condition to thereby restrain the webbing through a direct clamping action which prevents the safety belt portions engaging the occupant from further protraction movement which might otherwise be allowed due to tightening of the webbing, or elongation of the webbing, portions wound about the spool 13. Such inertia operated safety belt webbing clamping means is illustrated generally at 10 in the within exemplary embodiment and will be described in detail hereinafter.

Referring to FIG. 3, clamping means, indicated generally at 35, are provided in the exemplary embodiment for selectively clamping the safety belt webbing 11 against further movement relative to the clamping means. The exemplary clamping means, indicated generally at 35, includes a housing 36 having a front wall 37, back wall 38 a right hand side wall 39 and a left hand side wall, unnumbered, mounted to bracket 62 which in turn is mounted to the B pillar 22 as subsequently described. Housing 36 is provided with a webbing passage, indicated generally at 40 through which the webbing 11 passes freely. A base clamp block 41 having a webbing facing abutment surface 42 is mounted within housing 36, as seen in FIG. 3, with an opposing front clamp block 43 presenting an inclined surface 44 facing toward the webbing and in spaced relation from surface 42 to not only provide for passage of webbing 11 therebetween, but also to provide clearance for operation of the clamping wedge member 45 as will be described hereinafter.

Figure 5:
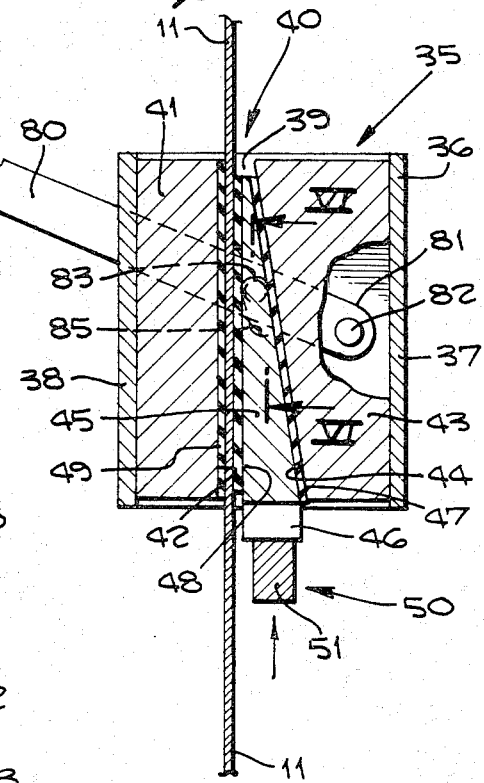
FIG. 5 is a detailed section view of the apparatus of FIG. 4 taken therein along the plane V—V.

Wedge shaped clamp member 45 is provided with a depending foot portion 46 which cooperates with means, indicated generally at 50, for mounting the clamp member 45 for movement from a webbing disengaging position, illustrated in FIG. 3, to a webbing clamping position illustrated in FIG. 5. The rear surface of wedge member 45 may be base metal or preferably coated with a layer 47 of material having a low coefficient of friction relative to the wedge member which is preferably made of a durable metal. As also particularly contemplated within the present invention, the front surface of wedge member 45 is provided with a layer 48 of a pliant, high strength, resilient material having a preferably relatively high coefficient friction. Further, a layer 49 of the same material as layer 48 is preferably provided upon the abutment surface 42 of base block 41 so that on movement of wedge member 45 from the webbing disengaging position of FIG. 3 to the webbing clamping position of FIG. 5, wedge movement relative inclined surface 44 is facilitated by the low coefficient of friction material layer 47 and, more importantly, webbing 11 is engaged by the opposing high strength, resilient material layers 48 and 49 as wedge member 45 clamps the webbing relative housing 36, as seen in FIG. 5. The clamping action of wedge member 45 upon webbing 11 against block 41 is evenly distributed upon the webbing without snagging or tearing of the webbing which might otherwise occur between a coarse surface or metal to webbing engagement. By the use of a high strength material, such as pvc coated polyester webbing, which presents a relatively soft, resilient and pliable surface toward the webbing, it is believed that the layers 48 and 49 distribute the loading of the clamping members evenly over the webbing surface while still providing an effective positive clamping of the webbing relative to housing 36.

The clamping means of the exemplary embodiment, illustrated generally at 35 and described hereinbefore, is in accordance with the present invention, operated to the clamping position of FIG. 5 in response to changes in inertia experienced by the vehicle in which the emergency locking apparatus is installed. Importantly for purposes of the present invention, the clamping means is operated independently of movement of the webbing so as to quickly clamp the webbing in response to the emergency condition, as opposed to being operated in response to movement of the webbing 11. In the exemplary embodiment, inertia responsive means, indicated generally at 55, are provided for operating the clamping means, indicated generally at 35, to the webbing locking position of FIG. 5. Such inertia responsive means cooperates with the aforementioned means for mounting the wedge member 55, indicated generally at 50. In the exemplary embodiment, such mounting means include the provision of a support bar 51 pivotally mounted by pivot 52 to a support plate 53 secured to housing 36. As can be seen from a comparison of FIGS. 2 and 4, pivotal movement of support bar 51 from the position of FIG. 2 in an upward direction to the position of FIG. 4 moves the wedge member 45, via its foot 46 from the webbing release position of FIG. 3 to the webbing clamping position of FIG. 5.

Biasing means, indicated generally at 65, are provided in the exemplary embodiment for normally biasing the clamping wedge member 45 toward the webbing clamping position of FIG. 5. In the exemplary embodiment, such biasing means, indicated generally at 65, include the provision of coil spring 66 mounted at its upper end to post 67 and at its lower end to a pivot pin 68 engaged in the other free end of support bar 51.

Releasable retaining means, indicated generally at 70, are provided in the exemplary embodiment for holding bar 51 normally against the bias of spring 66. In the exemplary embodiment, such retaining means include the provision of a geometric, or "over center" locking linkage including trigger link 71, having a generally S configuration, pivoted at its approximate center by pivot pin 72 to bracket 61. Bracket 61 is mounted by its back plate 62 to the vehicle frame such as member 22 which is exemplary of the vehicle B pillar structure. The locking linkage includes in addition to trigger link 71, the connecting link 73 which is pivoted at pin 74 to the lower end of link 71 and at pin 68 to the bar 51. The geometry of links 71 and 73 at their intersection adjacent pivot 72 is provided so as to prevent over center movement of the linkage beyond the position illustrated in FIG. 2, wherein bar 51 is locked against the bias of spring 66. In addition, the lower free end 76 of link 71 may be provided to abut the bracket wall 62 to also limit such over center movement. Spring means may also be provided in known manner, per se, to urge the link 71 and 73 into the over center position of FIG. 2.

Vehicle inertia sensor means are provided including a pendulum type inertial mass 57 suspended in adjustable manner upon threaded stem 58 which in turn is suspended by head 59. In the event of vehicle acceleration, or deceleration of more than a predetermined amount, which is determined by the positioning of mass 57 vertically along stem 58, the mass 57 and its associated head 59 will act as a tripping means for tripping linkage 71, 73. As head 59 tilts beneath trigger link 71 in FIG. 2, its rotative movement about pivot 72 moves the pivot 74 to the left in FIG. 2 allowing an unblocking position for the linkage to be assumed, as seen in FIG. 4, under the urging of spring 66 which biases arm 51 upward in FIG. 4. Such tripping action of linkage 71, 73 acts very rapidly in response to movement of mass 57 such that the clamping means, indicated generally at 35, is quickly activated to clamp webbing 11 in a manner unrelated to movement of the webbing and independently of any concurrent restraint action the retractor, indicated generally at 12, may be applying to webbing 11.

Figure 6:
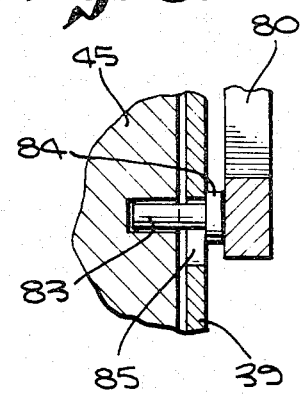
FIG. 6 is a detailed section view taken in FIG. 5 along the plane VI—VI.

Means are provided for resetting the clamping wedge member 45 to the webbing release position of FIG. 3 following its activation to the webbing clamping position of FIG. 5. As is apparent from the foregoing description, spring 66 holds arm 51 in a raised position, as seen in FIG. 4, when the pendulum mass 57 has acted upon linkage 71, 73. In the exemplary embodiment, such means for resetting the positioning of wedge block 45 include the provision of reset handle 80 which is pivotally mounted at its lower end 81 via pivot pin 82 to the housing wall 39. A cam pin 83 is provided on handle 80, as best seen in FIGS. 3, 5 and 6, for engaging wedge member 45 directly. As best seen in FIG. 6, cam pin 83 is mounted by boss 84 to handle 80 and passes through an elongated aperture 85 in housing wall 39 to facilitate moving wedge member 45 from the position of FIG. 5, back to the position of FIG. 3 by manually pivoting handle 80 from the position of FIG. 5, in a downward direction, to the position of FIG. 3.

As should now be apparent to those skilled in the art, from the foregoing detailed description, the exemplary vehicle inertia operated safety belt webbing clamping means illustrated generally at 10 may be used as the primary, or only, belt locking means or, as illustrated, in association with an emergency locking safety belt retractor to provide a dual locking system as illustrated. In a dual locking system, as illustrated, the safety belt retractor mechanism indicated generally at 12 may be provided to lock up at a relatively low vehicle acceleration, or deceleration rate, such as 0.7G's. This setting for the retractor will provide for restraining the safety belt in the event of sudden deceleration of the vehicle such as occurs during severe braking. The safety belt webbing clamping means, indicated generally at 10, could be set to be activated in response to a more severe emergency condition as might produce a higher G level on the order of as high as 5G's. In such a system, minor changes in vehicle inertia as occurs during non vehicle collision maneuvering will provide for a safety belt restraint, by locking of the retractor indicated generally at 12, while a more severe emergency situation as might be occasioned by vehicle collision will cause activation of the positive acting belt restraint provided for by the high strength, high load receiving clamping apparatus indicated generally at 10 herein. In such an arrangement, the retractor can be made of a more light weight, even plastic material, construction as compared to current retractors in commercial use. Alternatively, the clamping apparatus indicated generally at 10 can be provided as the primary, or sole safety belt restraining means and could be set to be activated at a lower G level as desired.

While a single wedge member 45 is illustrated in the present embodiment, it should be understood by those skilled in the art that a pair of opposing wedges, as by a symetrical arrangement of wedges 45 with inclined surfaced clamp blocks 43, could be employed with actuation by a single biasing means. Also, the actuation of the wedge, or wedges, to a clamping position can be powered by alternative means other than spring means, such as by a electrically driven solenoid, a pyrotectic device or the like where the activation thereof is in response to changes in vehicle inertia.

I claim:

1. A safety belt webbing emergency locking apparatus comprising:

clamping means for selectively clamping safety belt webbing against further movement relative to the clamping means, said clamping means including a wedge shaped clamp member moveably disposed between a vertical aubtment surface and an inclined surface spaced from said vertical abutment surface with said webbing passing between said clamp member and said vertical abutment surface;

support means for underlying said clamp member and normally supporting it in a webbing disengaging position;

biasing means connected to said support means for normally biasing said support means underlying said clamp member to move vertically and drive said wedge shaped clamp member against said inclined surface to cause it to clamp said webbing against said abutment surface in a webbing clamping position;

releasable retaining means connected to said support means and normally holding said support means against the bias of said biasing means with said clamp member in said webbing disengaging position; and inertia responsive means for operating said releasable retaining means independently of webbing movement to release said support means in response to vehicle acceleration or deceleration, of more than a predetermined amount in any generally horizontal direction whereby the bias of said biasing means is allowed to bias said support means vertically to drive said wedge shaped clamp member vertically against said inclined surface to clamp said webbing against said abutment surface and thereby prevent said further relative movement of said webbing relative said locking apparatus.

2. The apparatus of claim 1 used in combination with an emergency locking safety belt webbing retractor having a retractor associated vehicle inertia sensing locking means for locking the retractor spool against webbing unwinding in response to a predetermined level of vehicle acceleration or deceleration and wherein said apparatus inertia responsive means is operative in response to a relatively higher level of vehicle acceleration, or deceleration than that of said retractor associated vehicle inertia sensing locking means.

3. A safety belt webbing emergency locking apparatus comprising:
   clamping means for selectively clamping safety belt webbing against further movement relative to the clamping means, said clamping means including a clamp member and support means underlying said clamp member to support and move said clamp member to clamp on said webbing;
   inertia responsive means for operating said support means independently of webbing movement to move said clamp member to a webbing clamping position wherein said webbing is clamped against said further relative movement, solely in response to vehicle acceleration, or deceleration, of more than a predetermined amount without dependence upon strap movement to place said clamping means in said clamping position;
   biasing means for normally biasing said support means to move said clamp member toward said webbing clamping position when said support means and clamp memer are in a nonclamping position;
   releasable retaining means for normally holding said support means in said nonclamping position against movement toward said webbing clamp position; and
   said inertia responsive means includes tripping means for operating said releasable retaining means to a release position without having to overcome the bias of said biasing means whereby said support means is moved by said biasing means to move said clamp member to said webbing clamping position without having to overcome the bias of said biasing means.

4. The apparatus of claim 3 wherein:
   said support means for said wedge shaped clamp member includes a pivotally mounted support bar underlying said wedge shaped clamp member and
   said biasing means comprises a spring operably connected to said support bar.

5. A safety belt webbing emergency locking apparatus comprising:
   clamping means for selectively clamping safety belt webbing against further movement relative to the clamping means, said clamping means including a wedge shaped clamp member and means for mounting said clamp member for movement from a webbing disengaging position to a webbing clamping position, said means for mounting said wedge shaped clamp member including a pivotally mounted support bar underlying said wedge shaped member; and
   inertia responsive means for operating said clamping means independently of webbing movement to a webbing clamping position wherein said webbing is clamped against said further relative movement, solely in response to vehicle acceleration, or deceleration, of more than a predetermined amount without dependence upon strap movement to place said clamping means in said clamping position, said inertia responsive means including biasing means for normally biasing said wedge shaped clamp member toward said webbing clamping position, said biasing means including a spring operably connected to said support bar;
   releasable retaining means for normally holding said wedge shaped member against movement toward said webbing clamping position; and
   vehicle inertia activated tripping means for operating said releasable retaining means to a release position whereby said wedge shaped member is moved by said biasing means to said webbing clamping position, wherein said releasable retaining means comprises an over center linkage operably connected between said vehicle inertia activated tripping means and said support bar whereby said linkage normally holds said bar against the bias of said spring and is released by action thereon of said vehicle inertia activated tripping means.

6. The apparatus of claim 5 wherein said vehicle inertia activated tripping means comprises a inertia sensing mass and associated means for engaging said over center linkage means whereby movement of said mass operates said linkage means to a release position.

7. A safety belt webbing emergency locking apparatus comprising:
   clamping means for selectively clamping safety belt webbing against further movement relative to the clamping means, said clamping means including a wedge shaped clamp member and means for mounting said clamp member for movement from a webbing disengaging position to a webbing clamping position, said means for mounting said wedge shaped member including a support member underlying said wedge shaped member; and
   inertia responsive means for operating said clamping means independently of webbing movement to a webbing clamping position wherein said webbing is clamped against said further relative movement, solely in response to vehicle acceleration or deceleration, of more than a predetermined amount without dependence upon strap movement to place said clamping means in said clamping position, said inertia responsive means including biasing means for normally biasing said wedge shaped clamp member toward said webbing clamping position, said biasing means including a spring operably connected to said support member;
   releasable retaining means for normally holding said wedge shaped member against movement toward said webbing clamping position; and
   vehicle inertia activated tripping means for operating said releasable retaining means to a release position whereby said wedge shaped member is moved by said biasing means to said webbing clamping position, wherein said releasable retaining means comprises linkage means operably connected between said vehicle inertia activated tripping means and said support member whereby said linkage normally holds said support member against the bias of said spring and is released by action thereon of said vehicle inertia activated tripping means.

8. A safety belt webbing emergency locking apparatus comprising:

clamping means for selectively clamping safety belt webbing against further movement relative to the clamping means, said clamping means including a stationary webbing abutment surface and a clamp member for clamping against webbing run between said member and said surface;

support means for said clamp member in a webbing disengaging position and for moving it to a webbing engaging and clamping position;

biasing means connected to said support means for normally biasing said support means to move said clamp member to said webbing engaging and clamping position;

releasable retaining means for normally holding said support means in said webbing disengaging position for said clamp member and being releasable without acting against said biasing means to provide an easy release of said support means;

vehicle inertia responsive tripping means for operating said releasable retaining means to release said support means to allow said support means to move said clamp member under the bias of said biasing means to said webbing engaging and clamping position without said tripping means having to overcome the bias of said biasing means on said support means.

* * * * *